US008855241B2

(12) United States Patent
Ting

(10) Patent No.: US 8,855,241 B2
(45) Date of Patent: Oct. 7, 2014

(54) APPARATUS FOR DECODING GLOBAL NAVIGATION SATELLITE SYSTEMS NAVIGATION DATA AND ASSOCIATED METHOD

(75) Inventor: Yuan-Wen Ting, Taichung (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 801 days.

(21) Appl. No.: 13/053,213

(22) Filed: Mar. 22, 2011

(65) Prior Publication Data

US 2012/0243642 A1 Sep. 27, 2012

(51) Int. Cl.

| | |
|---|---|
| ***H03K 9/00*** | (2006.01) |
| ***H04L 27/06*** | (2006.01) |
| ***G01S 19/24*** | (2010.01) |
| ***G01S 19/21*** | (2010.01) |

(52) U.S. Cl.

CPC ............... *H04L 27/06* (2013.01); *G01S 19/246* (2013.01); *G01S 19/243* (2013.01); *G01S 19/21* (2013.01)

USPC .......................................... 375/316; 375/340

(58) Field of Classification Search

CPC ..................................................... G01S 19/243

USPC ................. 375/316, 340, 343; 342/350, 352, 342/357.2, 357.21, 357.22, 357.25, 357.39; 701/412, 32.4, 120

See application file for complete search history.

(56) References Cited

U.S. PATENT DOCUMENTS

| | | | | |
|---|---|---|---|---|
| 5,768,319 | A | 6/1998 | Durboraw, III | |
| 8,615,056 | B2 | 12/2013 | Di Grazia | |
| 8,620,580 | B2 * | 12/2013 | Alanen et al. | 701/468 |
| 2006/0126762 | A1 | 6/2006 | Tapucu | |
| 2007/0063890 | A1 * | 3/2007 | Yu | 342/357.02 |
| 2008/0143594 | A1 | 6/2008 | Wang | |
| 2008/0165057 | A1 * | 7/2008 | Li et al. | 342/357.15 |
| 2010/0182197 | A1 * | 7/2010 | Krasner | 342/357.25 |
| 2011/0007783 | A1 * | 1/2011 | Weill | 375/150 |
| 2012/0170688 | A1 * | 7/2012 | Di Grazia et al. | 375/340 |

FOREIGN PATENT DOCUMENTS

CN 1991403 B 6/2011

* cited by examiner

*Primary Examiner* — Tesfaldet Bocure

(74) *Attorney, Agent, or Firm* — Winston Hsu; Scott Margo

(57) ABSTRACT

An apparatus for decoding GNSS navigation data to generate at least a target string or subframe includes a demodulator and a processing unit. The demodulator is utilized for demodulating a received signal to generate at least a plurality of strings or subframes having a same string index or subframe index.

The processing unit is coupled to the demodulator, and is utilized for determining the target string or subframe according to the plurality of strings or subframes.

12 Claims, 12 Drawing Sheets

APPARATUS FOR DECODING GLOBAL NAVIGATION SATELLITE SYSTEMS NAVIGATION DATA AND ASSOCIATED METHOD

BACKGROUND OF THE INVENTION

1. Field of the Invention

The present invention relates to a Global Navigation Satellite Systems (GNSS) receiver, and more particularly, to an apparatus for decoding GNSS navigation data and an associated method.

2. Description of the Prior Art

In a navigation system, such as Global Positioning System (GPS) or GLObal NAvigation Satellite System (GLONASS), data decoding sensitivity is an important issue. A higher sensitivity represents a better Time-to-First-Fix (TTFF) performance. Therefore, how to improve navigation data decoding sensitivity, e.g. to reduce the bit error rate, is an important topic for modern GNSS receiver designs.

SUMMARY OF THE INVENTION

It is therefore an objective of the present invention to provide an apparatus for decoding GNSS navigation data and an associated method that have improved data decoding sensitivity, to solve the above-mentioned problems.

According to one embodiment of the present invention, an apparatus for decoding GNSS navigation data to generate at least a target string or subframe comprises a demodulator and a processing unit. The demodulator is utilized for demodulating a received signal to generate at least a plurality of strings or subframes having a same string index or subframe index. The processing unit is coupled to the demodulator, and is utilized for determining the target string or subframe according to the plurality of strings or subframes.

According to another embodiment of the present invention, a method for decoding GNSS navigation data to generate at least a target string or subframe comprises: demodulating a received signal to generate at least a plurality of strings or subframes having a same string index or subframe index; and determining the target string or subframe according to the plurality of strings or subframes.

According to another embodiment of the present invention, an apparatus for decoding GNSS navigation data to generate at least a target string or subframe comprises a demodulator, a first decision unit and a processing unit. The demodulator is utilized for demodulating a received signal to generate at least a plurality of strings or subframes having a same string content or subframe content. The first decision unit is utilized for determining a status of at least one of the plurality of strings or subframes according to the received signal. The processing unit is coupled to the demodulator and the first decision unit, where when at least one of the plurality of strings or subframes is determined as a first status, the processing unit determines the target string or subframe according to the plurality of strings or subframes.

According to another embodiment of the present invention, a method for decoding GNSS navigation data to generate at least a target string or subframe comprises: demodulating a received signal to generate at least a plurality of strings or subframes having a same string content or subframe content; determining a status of at least one of the plurality of strings or subframes according to the received signal; and when at least one of the plurality of strings or subframes is determined as a first status, determining the target string or subframe according to the plurality of strings or subframes.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 3:
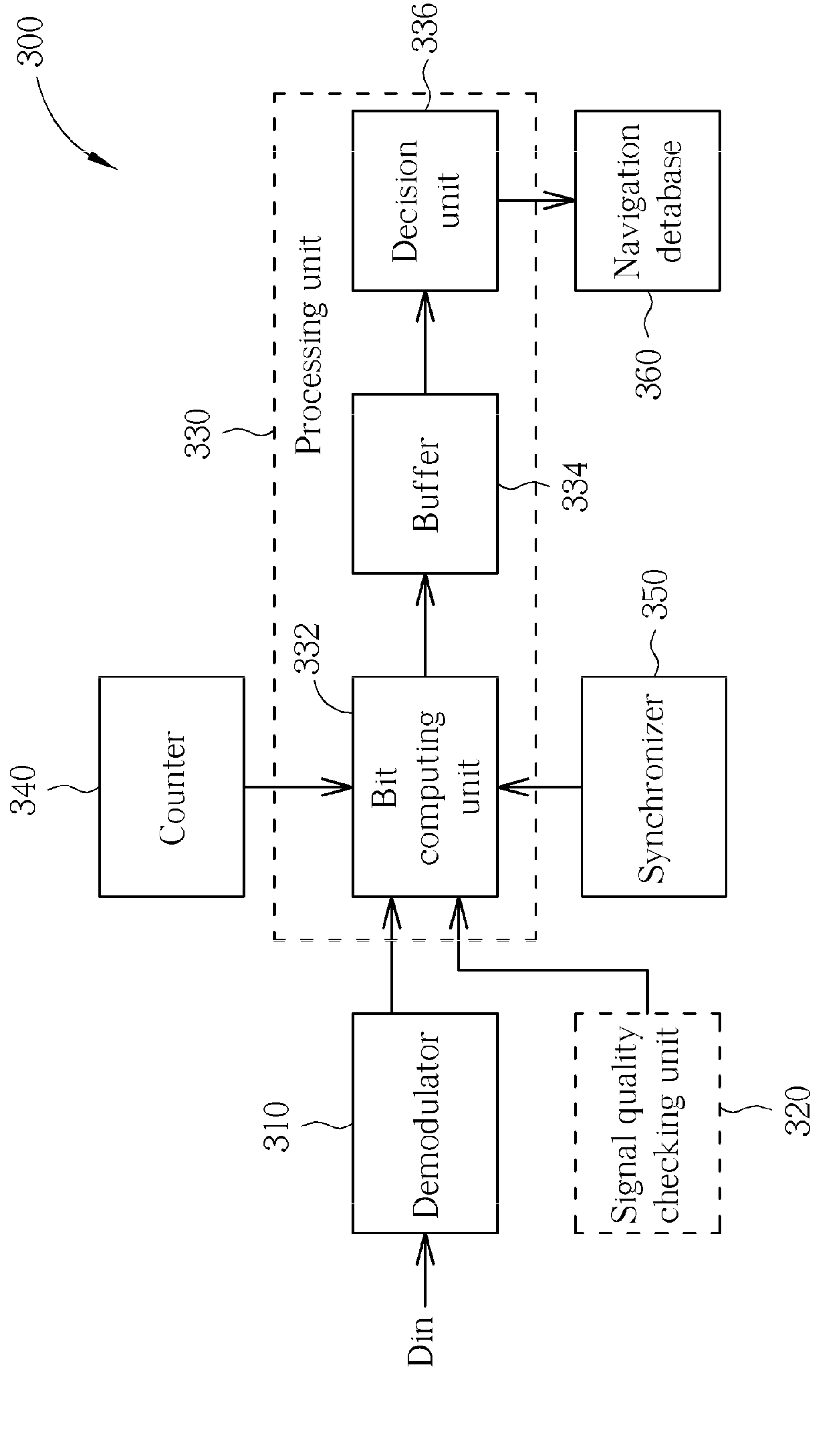
FIG. 3 is a diagram illustrating an apparatus for decoding GNSS navigation data according to one embodiment of the present invention.

Please refer to FIG. 3. FIG. 3 is a diagram illustrating an apparatus 300 for decoding GNSS navigation data according to one embodiment of the present invention. As shown in FIG. 3, the apparatus 300 comprises a demodulator 310, a signal quality checking unit 320, a processing unit 330, a counter 340, a synchronizer 350 and a navigation database 360, where the processing unit 330 includes a bit computing unit 332, a buffer 334 and a decision unit 336. In addition, the signal quality checking unit 320 is an optional device, and can be removed from the apparatus 300 without influencing the process of the apparatus 300.

Figure 4:
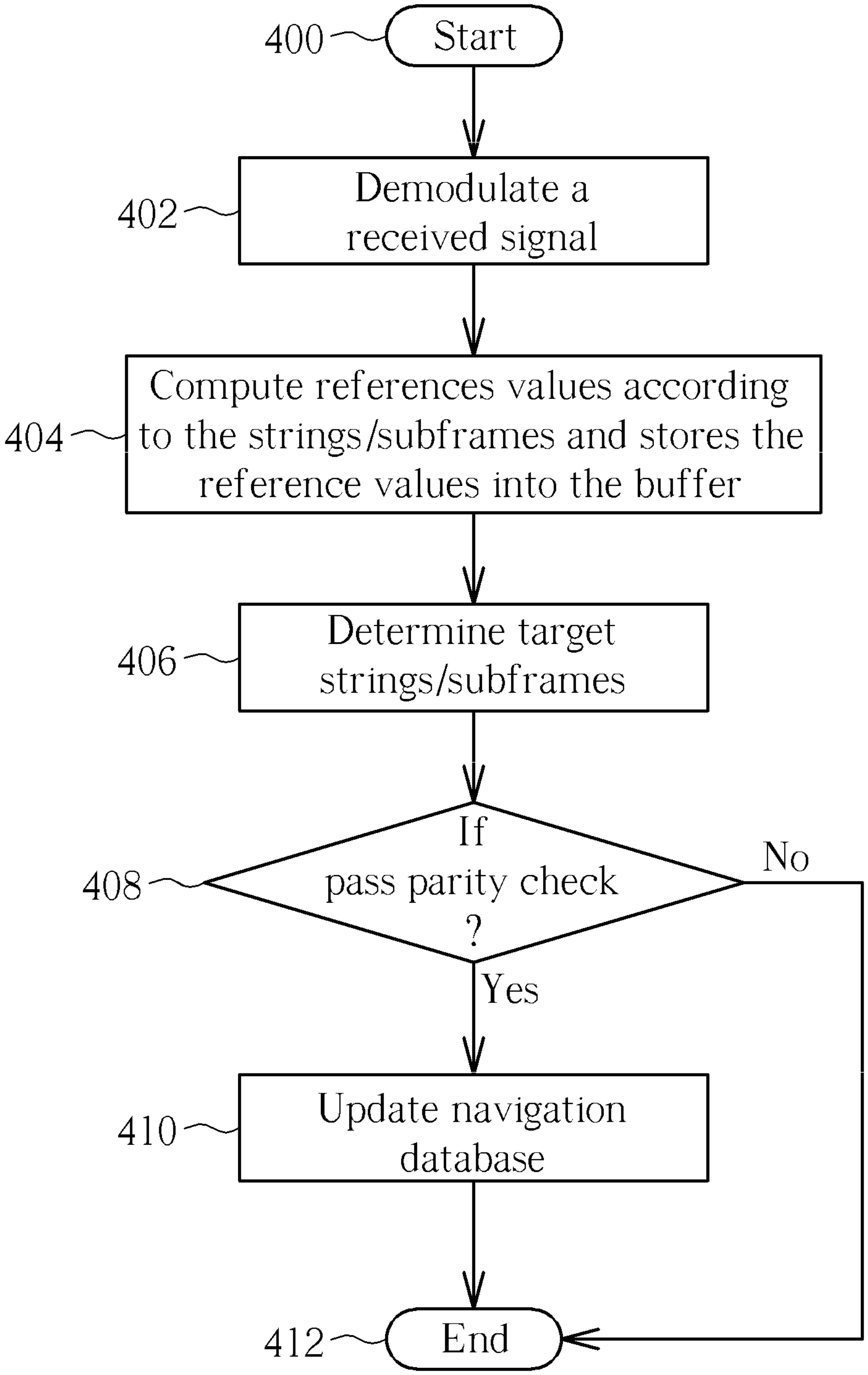
FIG. 4 is a flowchart of a method for decoding GNSS navigation data according to one embodiment of the present invention.

Please refer to FIG. 3 and FIG. 4 together. FIG. 4 is a flowchart of a method for decoding GNSS navigation data according to one embodiment of the present invention. Please note that, provided the results are substantially the same, the steps are not limited to be executed according to the exact order shown in FIG. 4. Referring to FIG. 4, the flow is described as follows:

In Step 400, the apparatus 300 receives a signal $D_{in}$ containing GNSS navigation data. Then, in Step 402, the demodulator 310 demodulates the received signal $D_{in}$ to generate a plurality of strings or subframes (for example, a plurality of strings may be generated when the GNSS navigation data includes GLONASS navigation data, a plurality of subframes may be generated when the GNSS navigation data includes GPS or Galileo navigation data, and other format data corresponding to the strings/subframes may be generated when the GNSS navigation data includes other navigation data). Then, in Step 404, for the strings having the same string index or the subframes having the same subframe index, the bit computing unit 332 computes a plurality of reference values according to values of the bits of the strings/subframes having the same string/subframe index, wherein each reference value is computed according to values of bits having a same bit index of the strings/subframes, and the bit computing unit 332 stores the reference values to the buffer 334. For the bit computing unit 332 computing the reference values in Step 404, the synchronizer 350 may provide information to make the bit computing unit 332 identify boundaries of each string or subframe, and the counter 340 may provide information to make the bit computing unit 332 identify bit indexes received by the bit computing unit 332. Then, in Step 406, the decision unit 336 determines target strings or target subframes according to the plurality of reference values stored in the buffer 334. In Step 408, it is determined if the target strings or the target subframes pass parity check. If yes, the flow enters Step 410; if not, the flow enters Step 412 to finish the process. In Step 410, the target strings/subframes are transmitted to a navigation database 360 to update the information stored therein. Then, in Step 412, the process is finished.

The present invention provides a decoding mechanism for GNSS navigation data that can increase data decoding sensitivity. Following takes GLONASS system as an example to illustrate the decoding flow. However, please be noted the present invention is not limited thereto.

Figure 1:
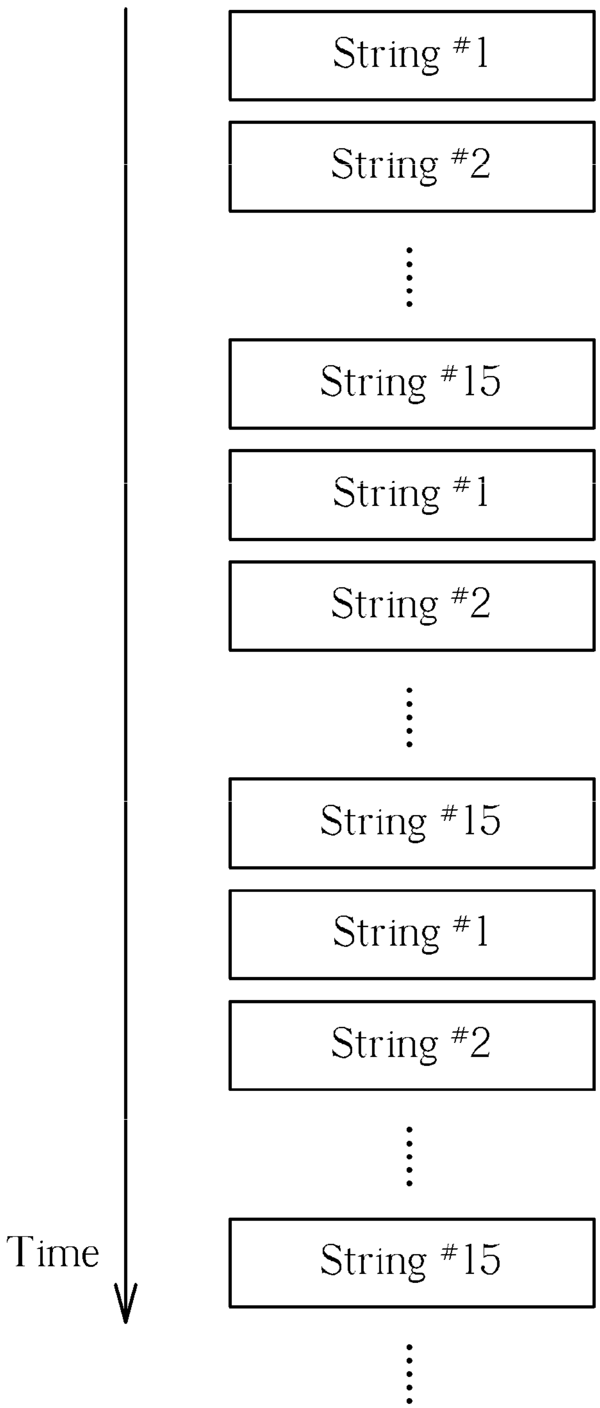
FIG. 1 PRIOR ART
FIG. 1 is a diagram illustrating strings of the GLONASS navigation data.
Figure 2:
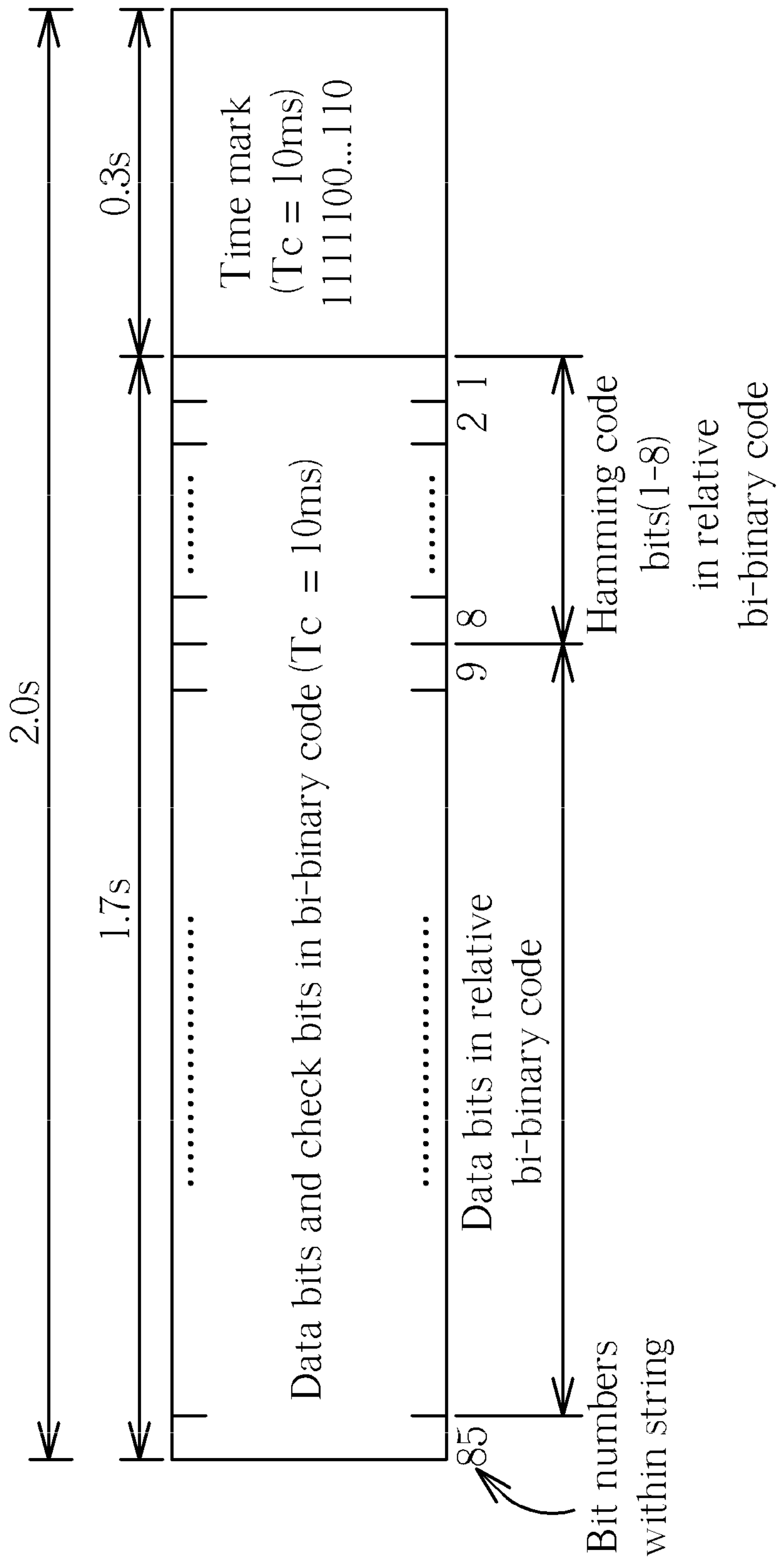
FIG. 2 PRIOR ART
FIG. 2 is a string structure of each string shown in FIG. 1.

In the GLONASS system, each satellite sends modulated strings #1-#15 continuously and repeatedly during thirty minutes. As shown in FIG. 1, after the satellite sends modulated strings #1-#15, the satellite will immediately send the same modulated strings #1-#15 again. In addition, FIG. 2 is a string structure of each string shown in FIG. 1. Referring to FIG. 2, each string has eighty-five bits having indexes 1-85 respectively. Because contents in FIG. 1 and FIG. 2 should be understood by a person skilled in this art, further descriptions are omitted here.

Figure 5:
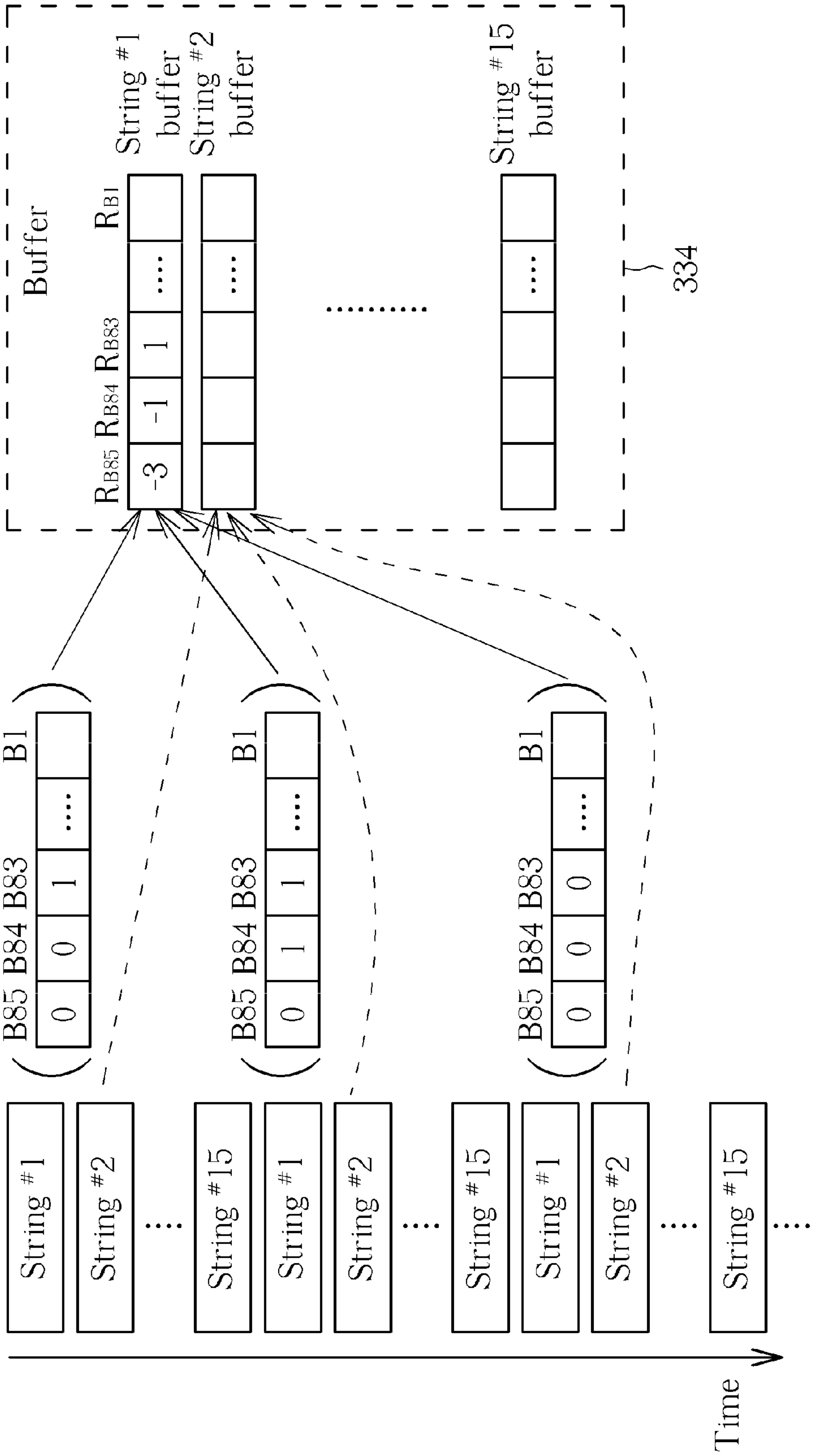
FIG. 5 is a diagram illustrating how the bit computing unit computes a plurality of reference values and stores the reference values to the buffer according to one embodiment of the present invention.

When the received signal $D_{in}$ containing GLONASS navigation data, the output of the demodulator 310 includes a plurality of strings. For the strings having the same string index, the bit computing unit 332 computes a plurality of reference values according to values of the bits of the strings having the same string index, wherein each reference value is computed according to values of bits having a same bit index. In one embodiment of the present invention, the bit computing unit 332 computes each reference value by accumulating or averaging the values of the bits having the same index of the plurality of strings. For an example to describe the above Step 404 in detail, please refer to FIG. 5. FIG. 5 is a diagram illustrating how the bit computing unit 332 computes a plurality of reference values and stores the reference values to the buffer 334 according to one embodiment of the present invention. Referring to FIG. 5, assuming that values of bits B85-B83 of the first string #1 (the string having index one in the first broadcast round of the satellite) are “0”, “0”, “1”, values of bit B85-B83 of the second string #1 (the string having index one in the second broadcast round of the satellite) are “0”, “1”, “1”, and values of bit B85-B83 of the third string #1 (the string having index one in the third broadcast round of the satellite) are “0”, “0”, “0”, then the references values RB85, RB84 and RB83 of a string #1 buffer in the buffer 334 can be calculated as follows:

$$RB85=(-1)+(-1)+(-1)=-3;$$

$$RB84=(-1)+(+1)+(-1)=-1;$$

$$RB83=(+1)+(+1)+(-1)=1.$$

where the term (−1) above means the bit value is “0”, while the term (+1) above means the bit value is “1”.

The reference value RB85 is calculated by accumulating the values of bits B85 of the three strings #1, the reference value RB84 is calculated by accumulating the values of bits B84 of the three strings #1, and the reference value RB83 is calculated by accumulating the values of bits B83 of the three strings #1. Then, the remaining reference values in the buffer 334 can be computed according to the above-mentioned method.

Figure 6:
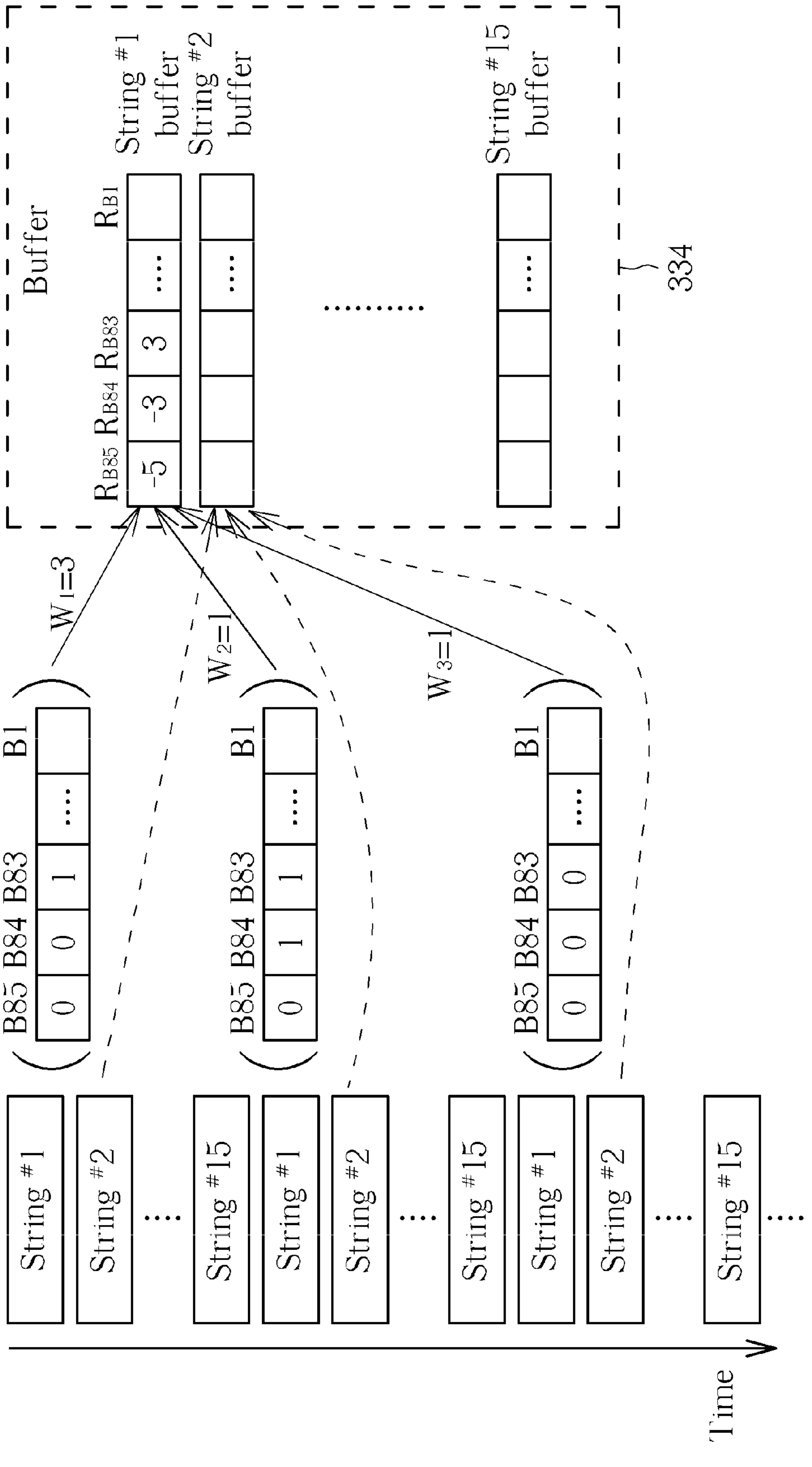
FIG. 6 is a diagram illustrating how the bit computing unit computes a plurality of reference values and stores the reference values to the buffer according to another embodiment of the present invention.

In addition, taking another example to computing the reference values, the signal quality checking unit 320 determines signal qualities of the strings according to the received signal $D_{in}$, for example, the signal qualities can be obtained by tracking the satellite signals. The bit computing unit 332 computes weighting factors of the values of the bits having the same bit index of the plurality of strings according to the signal qualities of the plurality of strings, and computes each reference value by accumulating the values of the bits having the same bit index of the plurality of strings respectively multiplied with the weighting factors. Please refer to FIG. 6. FIG. 6 is a diagram illustrating how the bit computing unit 332 computes a plurality of reference values and stores the reference values to the buffer 334 according to another embodiment of the present invention. Referring to FIG. 6, assuming that values of bits B85-B83 of the first string #1 are “0”, “0”, “1”, values of bit B85-B83 of the second string #1 are “0”, “1”, “1”, values of bit B85-B83 of the third string #1 are “0”, “0”, “0”, the first string #1 has better signal quality and corresponds to a weighting factor “3” and the second string #1 and the third string #1 has poor signal quality and corresponds to a weighting factor “1”, then the references values RB85, RB84 and RB83 of a string #1 buffer in the buffer 334 can be calculated as follows:

$$RB85=3*(-1)+1*(-1)+1*(-1)=-5;$$

$$RB84=3*(-1)+1*(+1)+1*(-1)=-3;$$

$$RB83=3*(+1)+1*(+1)+1*(-1)=3.$$

where the term (−1) above means the bit value is “0”, while the term (+1) above means the bit value is “1”. Then, the remaining reference values in the buffer 334 can be computed according to the above-mentioned method.

It is noted that the above-mentioned methods in FIG. 5 and FIG. 6 are merely an embodiment of the present invention. In other embodiments, each reference value can be calculated by accumulating more than three bit values, and the method is not limited to use the term (−1) to represent the bit "0" and the term (+1) to represent the bit "1". A person with ordinary skill in the art should understand there might be other average algorithms or accumulation algorithms that can obtain substantially the same results. As long as each reference value is computed according to values of bits having a same bit index of the strings having the same string index, these alternative designs should fall within the scope of the present invention.

In addition, during the bit computing unit 332 computing the reference values in Step 404, the synchronizer 350 provides information to make the bit computing unit 332 identify boundaries of each string, and the counter 340 provides information to make the bit computing unit 332 identify bit/string indexes received by the bit computing unit 332.

Then, in Step 406, the decision unit 336 determines target strings according to the plurality of reference values stored in the buffer 334. Taking the embodiment shown in FIG. 5 as an example, because the reference values RB85-RB83 stored in the string #1 buffer are "−3", "−1" and "1", respectively, the decision unit 336 can determine that the values of bits B85-B83 of a target string #1 are "0", "0" and "1", respectively, because a negative reference value means there is a higher probability the bit value is "0" while a positive reference value means there is a higher probability the bit value is "1". Then, the remaining bit values of the target strings #1-#15 can be determined according to the above-mentioned method.

In Step 408, it is determined if the target strings #1-#15 pass parity check. If yes, the flow enters Step 410; if not, the flow enters Step 412 to finish the process. In Step 410, the target strings #1-#15 are transmitted to a navigation database 360 to update the information stored therein. Then, in Step 412, the process is finished.

Figure 7:
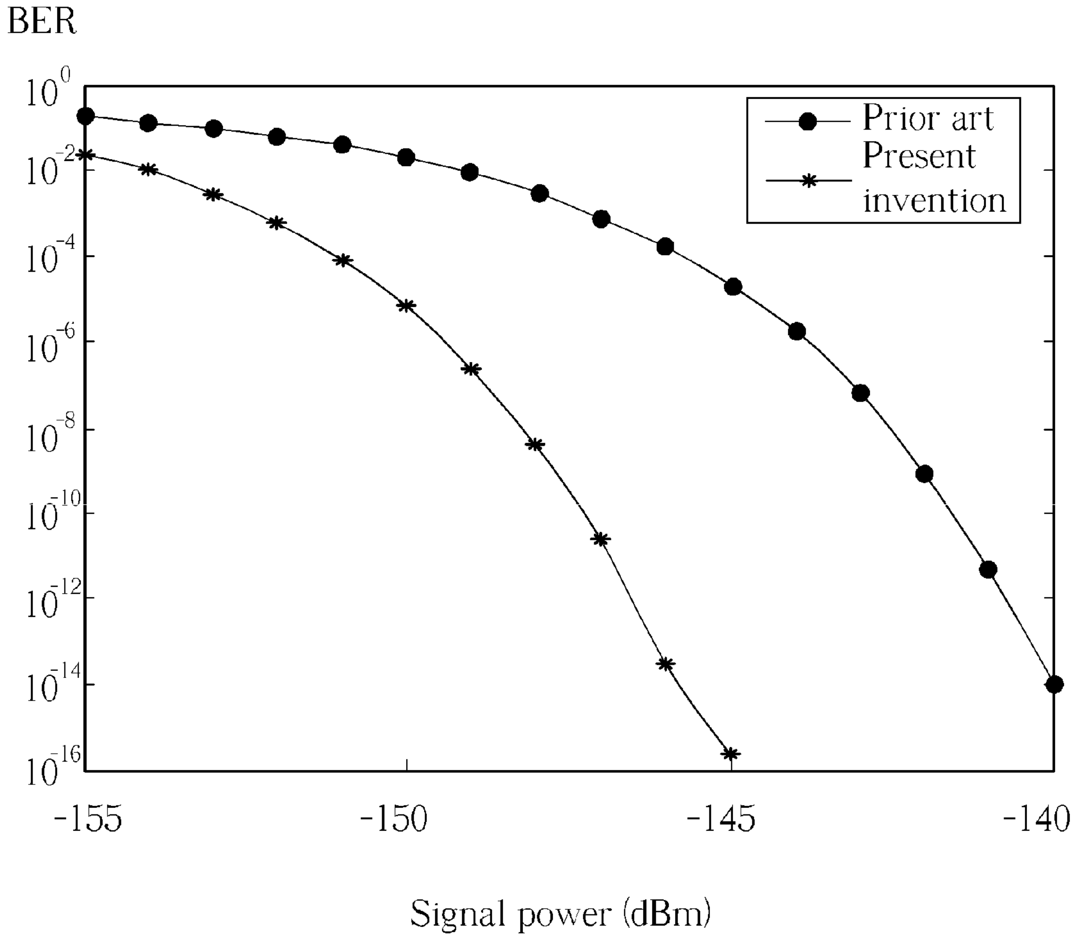
FIG. 7 is a diagram showing a comparison of bit-error rates of the prior art technique and the present invention.

Compared with the prior art method for decoding the navigation data, the method of the present invention can improve decoding sensitivity by about 5 dB as shown in FIG. 7.

Figure 8:
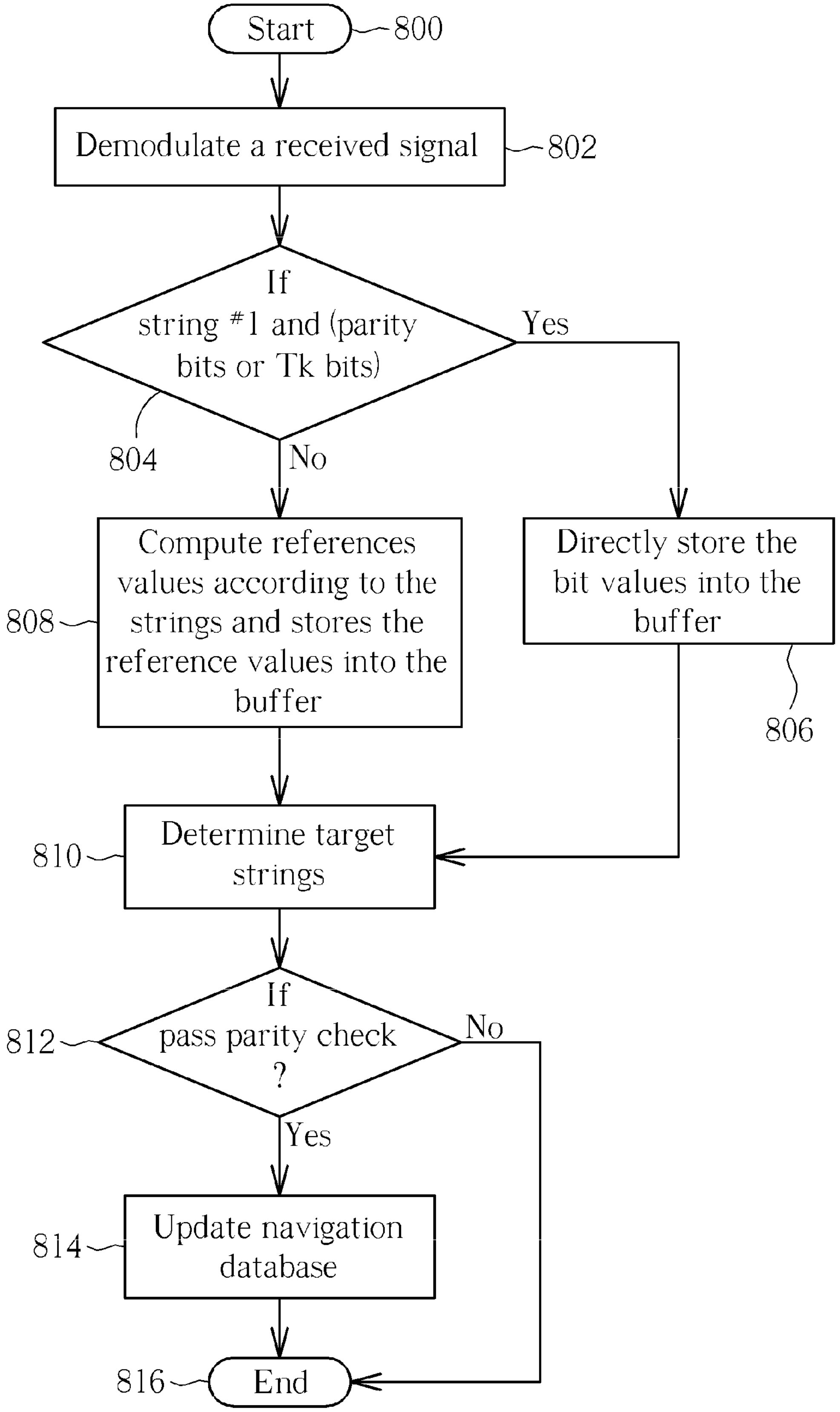
FIG. 8 is a flowchart of a method for decoding GNSS navigation data according to another embodiment of the present invention.

FIG. 8 is a flowchart of a method for decoding GNSS navigation data according to another embodiment of the present invention. Please note that, provided the results are substantially the same, the steps are not limited to be executed according to the exact order shown in FIG. 8. Referring to FIG. 8, the flow is described as follows:

In Step 800, the apparatus 300 receives a signal $D_{in}$ containing GNSS navigation data such as GLONASS navigation data. Then, in Step 802, the demodulator 310 demodulates the received signal $D_{in}$ to generate a plurality of strings having string indexes 1-15 respectively as shown in FIG. 1. Then, in Step 804, it is determined if the bit computing unit 332 is processing Tk bits or parity check bits of string #1. If yes, the flow enters Step 806; if not, the flow enters Step 808. In Step 806, if the bit computing unit 332 is processing bits having indexes 65-76, then the bit computing unit 332 directly stores values of the bits B65-B76 to the string #1 buffer of the buffer 334 and the values of the bits B65-B76 serve as reference values RB65-RB76, respectively (the meaning of the string #1 buffer and reference values can refer to FIG. 5 or FIG. 6). For example, if the values of the bits B65-B67 are "0", "0", "1", respectively, then the reference values RB65-RB67 are "−1", "−1", "1", respectively. This is because the timing information (Tk bits) and parity check bits of each string are different. Accumulation of those data bits does not help decoding sensitivity improvement. In other words, Step 804 is substantially equal to determine if the demodulated bits are in special cases, e.g. the contents represented by the demodulated bits are different for each string and therefore there is no need to compute the reference values for those bits.

In Step 808, the bit computing unit 332 computes a plurality of reference values according to values of the bits of the strings having the same string index, wherein each reference value is computed according to values of bits having a same bit index of the strings, and the bit computing unit 332 stores the reference values to the buffer 334. Step 808 is similar to Step 404 shown in FIG. 4. Therefore, in Step 808, in one embodiment, the bit computing unit 332 computes each reference value by accumulating the values of the bits having the same index of the plurality of strings having the same string index; and in another embodiment, the signal quality checking unit 320 determines signal qualities of the strings according to the received signal $D_{in}$, and the bit computing unit 332 computes weighting factors of the values of the bits having the same bit index of the plurality of strings according to the signal qualities of the plurality of strings, and computes each reference value by accumulating the values of the bits having the same bit index of the plurality of strings respectively multiplied with the weighting factors. Because detailed descriptions have been illustrated in Step 404, further descriptions are omitted here.

In addition, during the bit computing unit 332 computing the reference values in Steps 806 and 808, the synchronizer 350 may provide information to make the bit computing unit 332 identify boundaries of each string, and the counter 340 provides information to make the bit computing unit 332 identify bit/string indexes received by the bit computing unit 332.

Then, in Step 810, the decision unit 336 determines target strings according to the plurality of reference values stored in the buffer 334. Taking the embodiment shown in FIG. 5 as an example, because the reference values RB85-RB83 stored in the string #1 buffer are "−3", "−1" and "1", respectively, the decision unit 336 can determine that the values of bits B85-B83 of a target string #1 are "0", "0" and "1", respectively because a negative reference value means there is a higher probability the bit value is "0" while a positive reference value means there is a higher probability the bit value is "1". Then, the remaining bit values of the target strings #1-#15 can be determined according to the above-mentioned method.

In Step 812, it is determined if the target strings #1-#15 pass parity check. If yes, the flow enters Step 814; if not, the flow enters Step 816 to finish the process. In Step 814, the target strings #1-#15 are transmitted to a navigation database 360 to update the information stored therein. Then, in Step 816, the process is finished.

Figure 9:
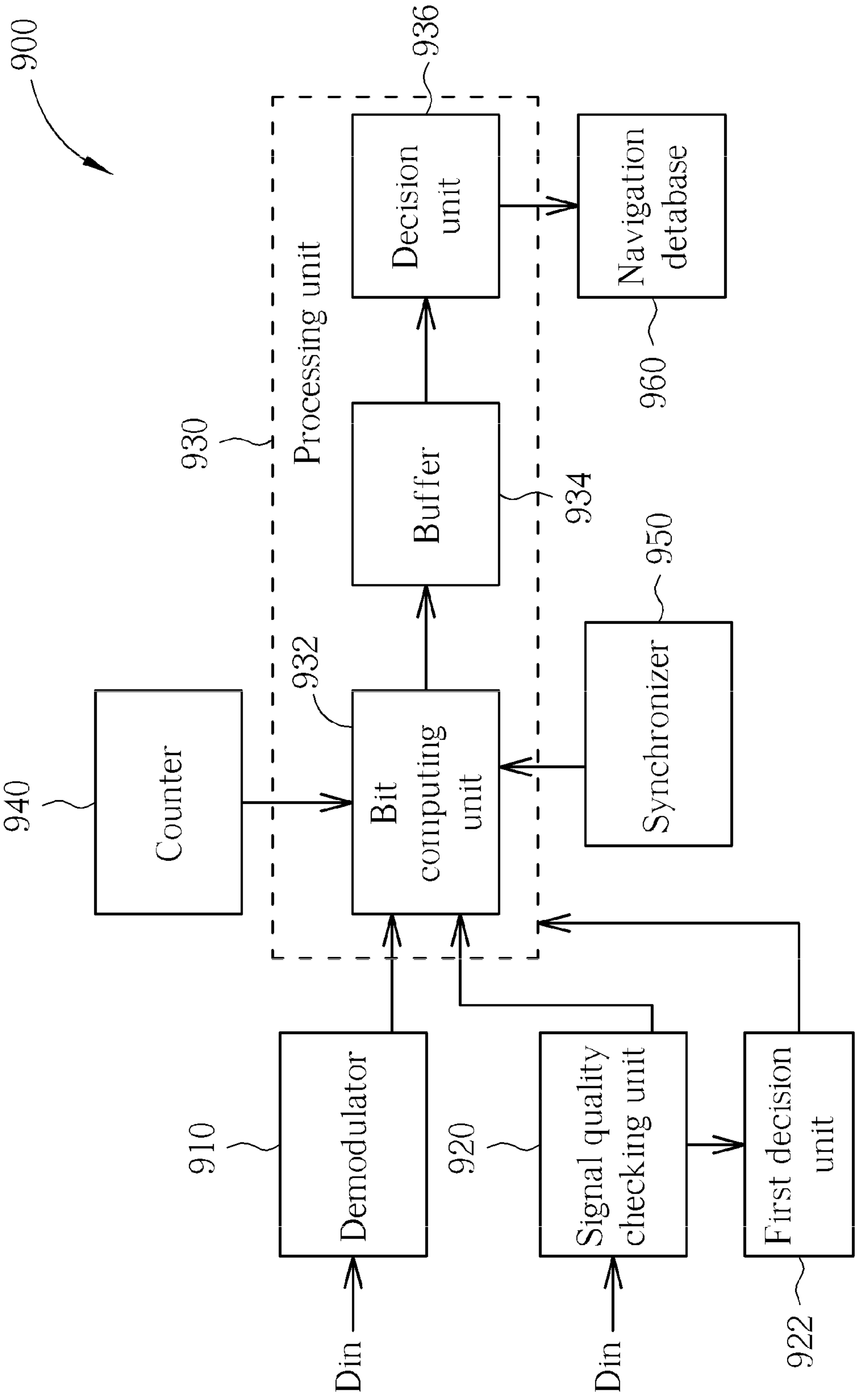
FIG. 9 is a diagram illustrating an apparatus for decoding GNSS navigation data according to another embodiment of the present invention.

Please refer to FIG. 9. FIG. 9 is a diagram illustrating an apparatus 900 for decoding GNSS navigation data according to another embodiment of the present invention. As shown in FIG. 9, the apparatus 900 comprises a demodulator 910, a signal quality checking unit 920, a first decision unit 922, a processing unit 930, a counter 940, a synchronizer 950 and a navigation database 960, where the processing unit 930 includes a bit computing unit 932, a buffer 934 and a second decision unit 936.

Figure 10:
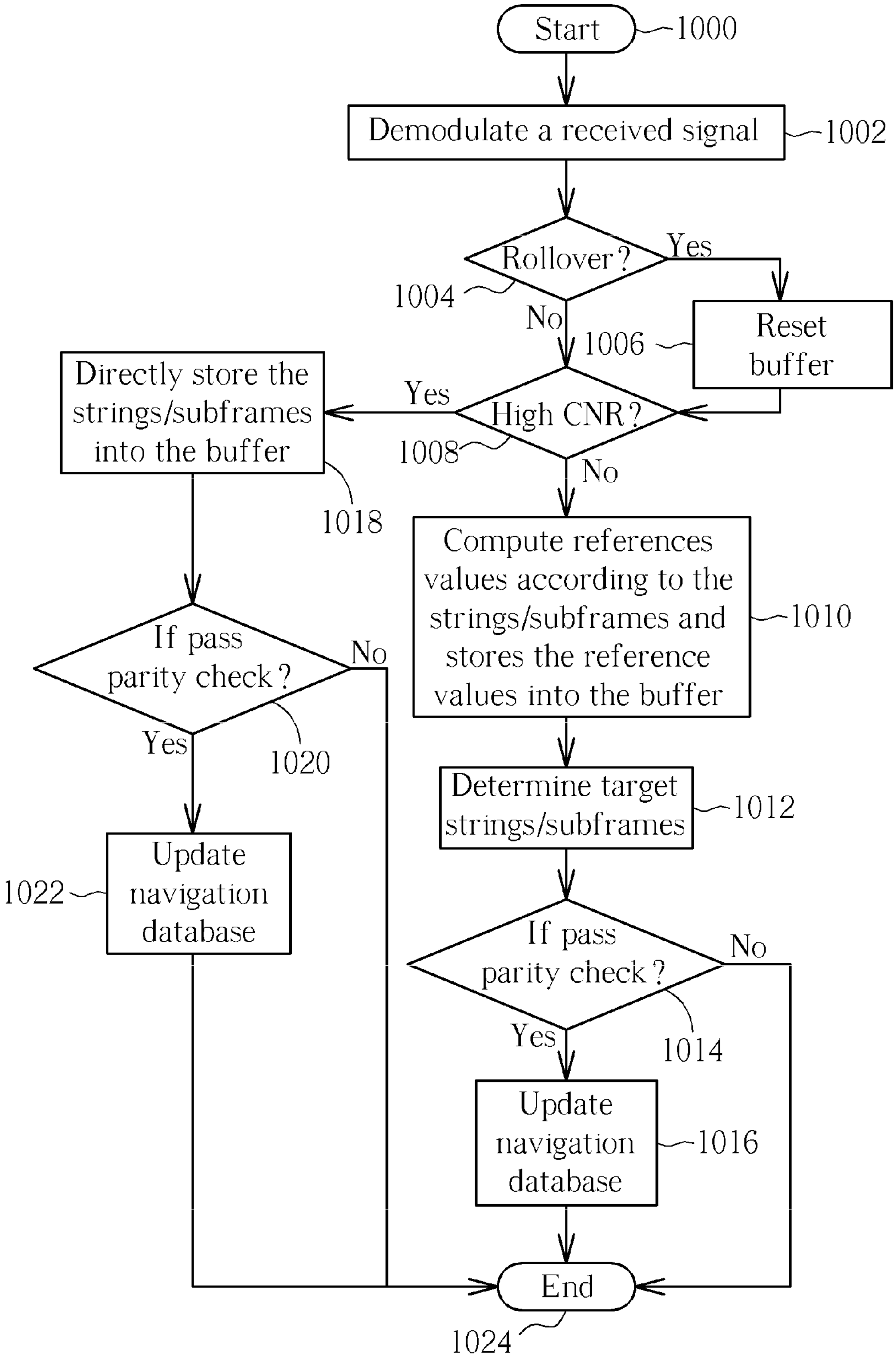
FIG. 10 is a flowchart of a method for decoding GNSS navigation data according to another embodiment of the present invention.

Please refer to FIG. 9 and FIG. 10 together. FIG. 10 is a flowchart of a method for decoding GNSS navigation data according to another embodiment of the present invention. Please note that, provided the results are substantially the same, the steps are not limited to be executed according to the exact order shown in FIG. 10. Referring to FIG. 10, the flow is described as follows:

In Step 1000, the apparatus 900 receives a signal $D_{in}$ containing navigation data. Then, in Step 1002, the demodulator 910 demodulates the received signal $D_{in}$ to generate a plurality of strings or subframes. For example, when the GNSS navigation data includes GLONASS navigation data, a plurality of strings may be generated; when the GNSS navigation data includes GPS navigation data or Galileo navigation data, a plurality of subframes may be generated; or when the GNSS navigation data includes data of other navigation systems, other format data corresponding to the strings/subframes may be generated. However, Then, in Step 1004, it is determined if the received signal $D_{in}$ is rollover (i.e., the satellite transmits new information, making the strings/subframes having the same index in current broadcast round and previous broadcast round not present the same contents). If yes, the flow enters Step 1006 to reset the buffer 934 and then goes to Step 1008; if not, the flow directly enters Step 1008. Then, in Step 1008, the signal quality checking unit 920 determines a signal quality indicator such as carrier-to-noise ratio (CNR) of the received signal $D_{in}$, and the first decision unit 922 determines a status of the strings or subframes according to the signal quality indicator such as CNR of the received signal $D_{in}$. In one embodiment, if it is determined the signal quality indicator such as CNR of the receive signal is lower than a threshold value, the strings/subframes are determined as a first status, and the flow enters Step 1010; and if it is determined the signal quality indicator such as CNR of the receive signal is higher than a threshold value, the strings/subframes are determined as a second status, and the flow enters Step 1018.

In Step 1010, for the strings or subframes having/representing the same string content or the subframes having/representing the same subframe content (for example, if string/subframe #1 and string/subframe #2 have/represent the same data, the string/subframe #1 and the string/subframe #2 are regarded as the same string/subframe content; in another example, the time information bits of each satellite signals are regarded as the same string/subframe content), the bit computing unit 932 computes a plurality of reference values according to values of the bits of the strings/subframes having the same string/subframe content, wherein each reference value is computed according to values of bits having a same bit content of the strings/subframes, and the bit computing unit 932 stores the reference values to the buffer 934. For the bit computing unit 932 computing the reference values in Step 1010, the synchronizer 950 may provide information to make the bit computing unit 932 identify boundaries of each string or subframe, and the counter 940 may provide information to make the bit computing unit 932 identify bit indexes received by the bit computing unit 932. Then, in Step 1012, the second decision unit 936 determines target strings or target subframes according to the plurality of reference values stored in the buffer 934. In Step 1014, it is determined if the target strings or the target subframes pass parity check. If yes, the flow enters Step 1016; if not, the flow enters Step 1024 to finish the process. In Step 1016, the target strings/subframes are transmitted to a navigation database 960 to update the information stored therein.

On the other hand, in Step 1018, the strings or subframes are directly stored into the buffer 934, and the second decision unit 936 directly uses the strings or subframes stored in the buffer 934 as target strings. Then, in Step 1020, it is determined if the target strings or the target subframes pass parity check. If yes, the flow enters Step 1022 and the target strings/subframes are transmitted to a navigation database 960 to update the information stored therein; if not, the flow enters Step 1024 to finish the process.

The present invention provides a decoding mechanism for GNSS navigation data that can increase data decoding sensitivity. Following takes GLONASS system as an example to illustrate the decoding flow. However, please be noted the present invention is not limited thereto.

In the GLONASS system, each satellite sends modulated strings #1-#15 continuously and repeatedly during thirty minutes. As shown in FIG. 1, after the satellite sends modulated strings #1-#15, the satellite will immediately send the same modulated strings #1-#15 again. In addition, FIG. 2 is a string structure of each string shown in FIG. 1. Referring to FIG. 2, each string has eighty-five bits having indexes 1-85 respectively.

When the received signal $D_{in}$ containing GLONASS navigation data, the output of the demodulator 910 includes a plurality of strings. If the strings have lower CNR, for the strings having the same string content, the flow enters Steps 1010-1016 to determine the target string according to the plurality of strings having the same string content, and the target string is transmitted to a navigation database 960 to update the information stored therein. Steps 1010-1016 are similar to Steps 404-410 shown in FIG. 4. A person skilled in this art should understand Steps 1010-1016 after reading the above disclosure. Therefore, further descriptions are omitted here.

On the other hand, if the strings have higher CNR, in Step 1018, the strings #1-#15 are directly stored into the buffer 934, and the second decision unit 936 directly uses the strings #1-#15 stored in the buffer 934 as target strings.

Then, in Step 1020, it is determined if the target strings #1-#15 pass parity check. If yes, the flow enters Step 1022; if not, the flow enters Step 1024 to finish the process. In Step 1022, the target strings #1-#15 are transmitted to a navigation database 960 to update the information stored therein. Then, in Step 1024, the process is finished. That is, the embodiment shown in FIG. 10 provides a mechanism to avoid mistaken accumulation during satellite rollover, and further provides a mechanism to fasten the flow when the satellite signal strength is high (e.g. high CNR).

Figure 11:
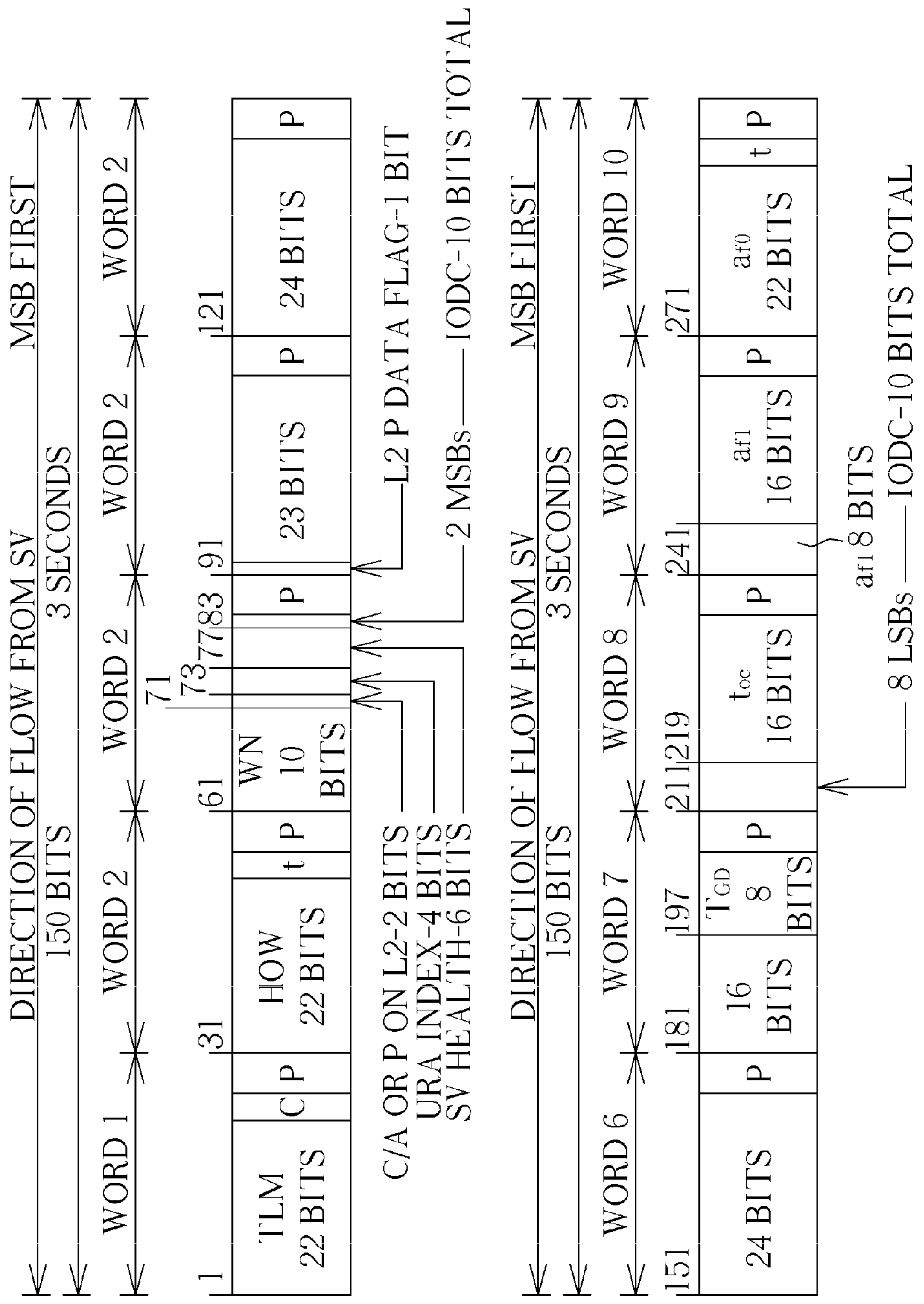
FIG. 11 is a subframe structure of each subframe of GPS data.
Figure 12:
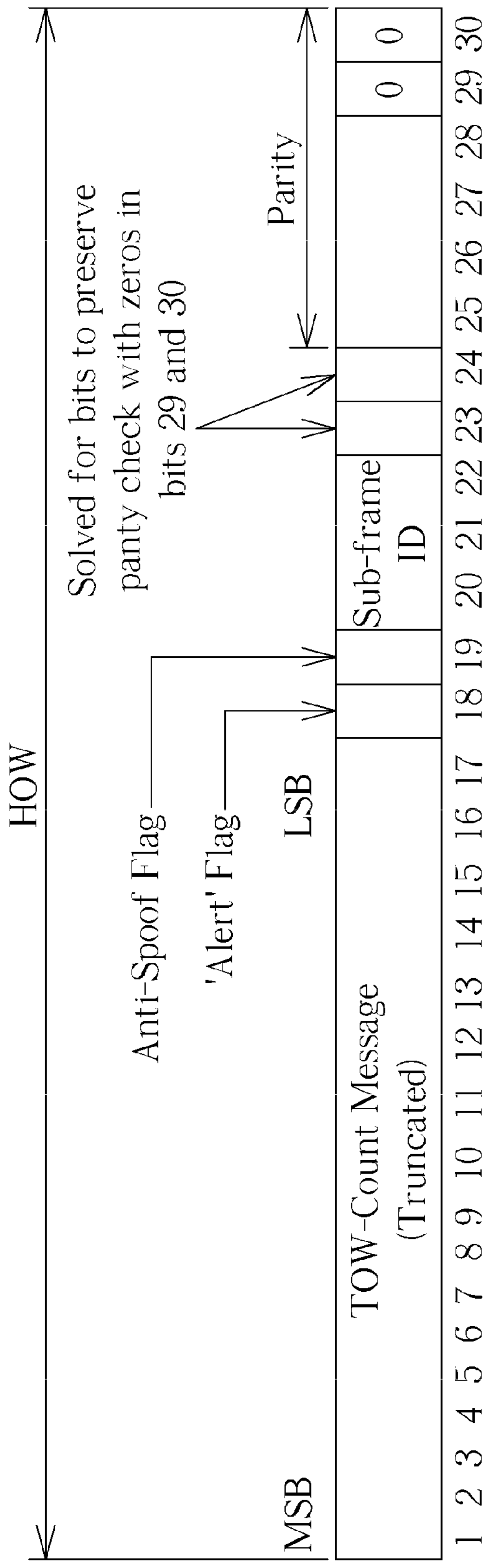
FIG. 12 is data structure of WORD2 of a subframe of the GPS data.

Please note that, although the above-mentioned embodiments are for decoding GLONASS navigation data, in other embodiments, the apparatus and method of the present invention can decode other GNSS navigation data such as GPS data, Galileo data and BeiDou (Compass) data. In detail, in the GPS system, each satellite sends modulated subframes #1-#3 continuously and repeatedly during two hours, and a subframe structure of GPS data is shown in FIG. 11. The apparatus such as 300 and 900 can demodulate a received signal $D_{in}$ to generate a plurality of subframes, and determine the target subframe according to the plurality of subframes by a method similar to the above descriptions in Steps 404, 406, 808, 810, 1010 and 1012. In addition, similar to the step 804 of FIG. 8, the bit computing unit may directly stores bit value of WORD2 of GPS navigation data into the buffer without computing reference values for WORD2. FIG. 12 shows the WORD2 of the subframe shown in FIG. 11, whose data is not always the same. The WORD2 of the target subframe is not determined according to the plurality of subframes having the same subframe index, and is determined by directly using the WORD2 of one of the subframes which is similar to Step 806.

Briefly summarized, in the apparatus for decoding GNSS navigation data and associate method of the present invention, each target string or subframe for updating navigation data is determined according to a plurality of strings or subframes having the same string/subframe index or same content. Therefore, the decoding sensitivity can be increased.

Those skilled in the art will readily observe that numerous modifications and alterations of the device and method may be made while retaining the teachings of the invention.

What is claimed is:

1. An apparatus for decoding Global Navigation Satellite Systems (GNSS) navigation data to generate at least a target string or a target subframe, comprising:

a demodulator, for demodulating a received signal to generate at least a plurality of strings having a same string index or a plurality of subframes having a same subframe index; and a processing unit, coupled to the demodulator, for determining the target string according to the plurality of strings or for determining the target subframe according to the plurality of subframes;

wherein each of the plurality of strings or subframes includes a plurality of bits, and the processing unit comprises:

a bit computing unit, for computing a plurality of reference values according to values of the bits of the plurality of strings or subframes, wherein each reference value is computed according to values of bits having a same bit index of the plurality of strings or subframes; and a decision unit, coupled to the bit computing unit, for determining the target string or the target subframe according to the plurality of reference values.

2. The apparatus of claim 1, wherein a number of the reference values is equal to a length of each of the strings or subframes.

3. The apparatus of claim 1, wherein the bit computing unit computes each reference value by accumulating or averaging the values of the bits having the same index of the plurality of strings or subframes.

4. The apparatus of claim 1, further comprising:

a signal quality checking unit, coupled to the bit computing unit, for determining signal qualities of the plurality of strings or subframes according to the received signal;

wherein the bit computing unit computes the plurality of reference values according to the values of the bits of the plurality of strings or subframes and the signal qualities of the plurality of strings or subframes.

5. The apparatus of claim 4, wherein the bit computing unit computes weighting factors of the values of the bits having the same bit index of the plurality of strings or subframes according to the signal qualities of the plurality of strings or subframes, and computes each reference value by accumulating the values of the bits having the same bit index of the plurality of strings or subframes respectively multiplied with the weighting factors.

6. The apparatus of claim 1, wherein the GNSS navigation data includes GLObal NAvigation Satellite System (GLONASS) navigation data, GPS navigation data, Galileo navigation data or BeiDou (Compass) navigation data.

7. A method for decoding Global Navigation Satellite Systems (GNSS) navigation data to generate at least a target string or a target subframe, comprising:

demodulating a received signal to generate at least a plurality of strings having a same string index or a plurality of subframes having a same subframe index; and determining the target string according to the plurality of strings or determining the target subframe according to the plurality of subframes;

wherein each of the plurality of strings or subframes includes a plurality of bits, and the step of determining the target string according to the plurality of strings or determining the target subframe according to the plurality of subframes comprises:

computing a plurality of reference values according to values of the bits of the plurality of strings or subframes, wherein each reference value is computed according to values of bits having a same bit index of the plurality of strings or subframes; and determining the target string or the target subframe according to the plurality of reference values.

8. The method of claim 7, wherein a number of the reference values is equal to a length of each of the strings or subframes.

9. The method of claim 7, wherein the step of computing the plurality of reference values comprises:

computing each reference value by accumulating the values of the bits having the same index of the plurality of strings or subframes.

10. The method of claim 7, further comprising:

determining signal qualities of the plurality of strings or subframes according to the received signal; and the step of computing the plurality of reference values comprises:

computing the plurality of reference values according to the values of the bits of the plurality of strings or subframes and the signal qualities of the plurality of strings or subframes.

11. The method of claim 10, wherein the step of computing the plurality of reference values comprises:

computing weighting factors of the values of the bits having the same bit index of the plurality of strings or subframes according to the signal qualities of the plurality of strings or subframes; and computing each reference value by accumulating the values of the bits having the same bit index of the plurality of strings or subframes respectively multiplied with the weighting factors.

12. The method of claim 7, wherein the GNSS navigation data includes GLObal NAvigation Satellite System (GLONASS) navigation data or GPS navigation data.

* * * * *